US010269247B2

(12) United States Patent
Ando

(10) Patent No.: US 10,269,247 B2
(45) Date of Patent: Apr. 23, 2019

(54) DRIVE SUPPORT APPARATUS

(71) Applicant: DENSO CORPORATION, Kariya, Aichi-pref. (JP)

(72) Inventor: Motonori Ando, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/401,141

(22) Filed: Jan. 9, 2017

(65) Prior Publication Data

US 2017/0206787 A1     Jul. 20, 2017

(30) Foreign Application Priority Data

Jan. 14, 2016   (JP) .................................. 2016-005473

(51) Int. Cl.
| | |
|---|---|
| G08G 1/16 | (2006.01) |
| G01C 21/30 | (2006.01) |
| H04B 1/3822 | (2015.01) |
| H04W 4/04 | (2009.01) |

(52) U.S. Cl.
CPC ............ *G08G 1/161* (2013.01); *G01C 21/30* (2013.01); *H04B 1/3822* (2013.01); *H04W 4/046* (2013.01)

(58) Field of Classification Search
CPC ..... G08G 1/161; H04W 4/046; H04B 1/3822; G01C 21/30
See application file for complete search history.

(56) References Cited

U.S. PATENT DOCUMENTS

| | | |
|---|---|---|
| 2002/0135467 A1 | 9/2002 | Koike |
| 2003/0006889 A1 | 1/2003 | Koike |
| 2003/0009275 A1 | 1/2003 | Koike |

FOREIGN PATENT DOCUMENTS

| | | |
|---|---|---|
| JP | 2000-276696 A | 10/2000 |
| JP | 2006-182207 A | 7/2006 |
| JP | 2008-097413 A | 4/2008 |
| JP | 2013-134567 A | 7/2013 |

*Primary Examiner* — Jerrah Edwards
*Assistant Examiner* — Mathew Franklin Gordon
(74) *Attorney, Agent, or Firm* — Harness, Dickey & Pierce, P.L.C.

(57) ABSTRACT

A drive support apparatus includes: a reliability determiner determining a reliability of a map matching, an area definer defining a determination area to include a cross point between a self-vehicle predicted path and a nearby vehicle predicted path, an intersection node finder determining an intersection node in a travel direction of the self-vehicle based on a high map matching reliability, and a node determiner determining whether the intersection node is found in the determination area. When no intersection node is found in the determination area, a drive support level is suppressed, and when the reliability is low, drive support is provided depending on whether the cross point between the self-vehicle predicted path and the other vehicle predicted path is found. Thus, lack of the drive support in a support-required situation is prevented, while preventing a provision of an unnecessary drive support.

7 Claims, 10 Drawing Sheets

| MAP MATCHING STATE | MM0 : NO MAP MATCHING<br>MM1 : PLURAL LINK CANDIDATES<br>MM2 : STATE OF TRANSITION<br>MM3 : LINK DETERMINED |
|---|---|

DRIVE SUPPORT APPARATUS

CROSS REFERENCE TO RELATED APPLICATION

The present application is based on and claims the benefit of priority of Japanese Patent Application No. 2016-005473, filed on Jan. 14, 2016, the disclosure of which is incorporated herein by reference.

TECHNICAL FIELD

The present disclosure generally relates to a drive support apparatus that supports a drive operation of a driver of a vehicle, especially regarding a drive support that is provided based on a prediction of a collision between vehicles.

BACKGROUND INFORMATION

A drive support apparatus for, for example, collision prediction and preventing collision between two vehicles is disclosed in a patent document, Japanese Patent Laid-Open No. 2008-97413, (Patent document 1). From such drive support apparatus, the drive support is provided for a driver of a subject vehicle having the apparatus in the following manner. That is, the subject vehicle bi-directionally communicates with other vehicle while predicting a future vehicle position for both of the subject vehicle and the other vehicle. Then, the predicted subject vehicle position and the predicted other vehicle position are compared with each other at a certain time of the future. Based on the comparison result, the possibility of collision is determined based on a closeness of the two vehicle's positions, and, when the predicted two vehicle's positions are very close to each other, safety support information is provided for the driver from the drive support apparatus.

For realizing the technique of the patent document 1, the position of the subject vehicle has to be predicted as a position on a road that is represented by map data, or by road map information. Thus, the current position of the subject vehicle has to be sequentially determined, point to point on a certain road. The current position of the subject vehicle may be determined by a well-known satellite navigation signal from a satellite of a Global Navigation Satellite System (GNSS), for example. The navigation signal from the satellite, however, includes a position determination error, which may result in an error of the determined current position, i.e., a position of the subject vehicle that is actually traveling on a certain road may sometimes be determined as a position other than, outside of, a traveling road due to the position determination error in a "GNSS current position" that is derived from the GNSS navigation signal described above.

A technique for correcting the GNSS current position is known, for example, as a map-matching. The map-matching corrects the current position of the vehicle onto a road by matching (i) a travel locus of the vehicle, which is a collection of the sequentially-determined current positions with (ii) a road shape of a road.

However, the map-matching may also be prone to a matching error, e.g., may wrongly match the travel locus of the vehicle to a road, i.e., to a road shape that is not completely matching with the travel locus, when a road shape somewhat close to the travel locus is found at a proximity of the current position, or in other words, a true/actual road on which the vehicle is traveling. Therefore, in some cases, the current position of the vehicle may be corrected, i.e., map-matched, to a different road that is different from the currently-traveling road.

Thus, the drive support based always on the map-matched current position may not yield an intended result, i.e., may lead to a situation in which the drive support is not provided when the support is actually needed.

The positioning of the subject vehicle and the other vehicle may also be performed, not by the map-matching, but by utilizing the GNSS current positions and the travel directions of those vehicles. By not performing the map-matching, lack of the drive support due to the current position wrongly matched to a different road will not be caused.

However, by not performing the map-matching, a collision possibility may be wrongly determined based on a wrong prediction of crossing of the two roads, i.e., the road traveled by the subject vehicle and the road traveled by the other vehicle which are actually not crossing with each other. Based on such a wrong prediction, an unnecessary drive support is provided for the driver.

SUMMARY

It is an object of the present disclosure to provide a drive support apparatus that is capable of preventing a lack of the drive support in an actually-required situation, while also preventing a provision of an unnecessary drive support.

In the following, the feature of the present disclosure is described by a combination of the elements in an independent claim, and the elements in dependent claims further describe other concrete advantages, in a non-limiting manner, which does not limit the scope of the present disclosure only to the concrete components in the following embodiments.

In an aspect of the present disclosure, a drive support apparatus includes a controller, the controller configured to include a drive support provider providing a drive support for a driver of a self-vehicle, a self-vehicle positioner sequentially determining a current position of the self-vehicle the drive support apparatus by sequentially obtaining a position that has been determined by receiving a navigation signal from a navigation satellite of a satellite navigation system, a reliability determiner sequentially determining a reliability of a map matching that matches the current position of the self-vehicle onto a road on a map, based on a comparison between a locus of the current position of the self-vehicle and a road shape, a self-vehicle path predictor providing a self-vehicle predicted path ($P_H$) based on the current position and a travel direction of the self-vehicle, a nearby vehicle path predictor providing a nearby vehicle predicted path ($P_R$) by obtaining, from a vehicle-to-vehicle communicator of the self-vehicle, predicted path information that predicts a path of a nearby vehicle, based on the current position and the travel direction of the nearby vehicle traveling nearby the self-vehicle, an area definer defining a determination area to include a cross point (X) between the self-vehicle predicted path ($P_H$) and the nearby vehicle predicted path ($P_R$), when the cross point (X) is formed as an intersection of the self-vehicle predicted path ($P_H$) and the nearby vehicle predicted path ($P_R$), an intersection node finder determining whether an intersection node of a road in the travel direction of the self-vehicle onto which the current position of the self-vehicle is map-matched by at least a preset-degree high reliability that is determined by the reliability determiner, the intersection node of the road representing an intersection in road map information and a node determiner determining whether the intersection node determined by the intersection node finder is found in the determination area that is defined by the area definer.

The drive support provider provides the drive support in a suppressed level that is suppressed, when the node fails to find the intersection node in the determination area, the suppressed level in which the drive support is provided to the driver is in a suppressed manner when compared to the drive support at a time when the intersection node is found in the determination area. Also, the drive support provider determines whether to provide the drive support, when the reliability of map matching is determined by the reliability determiner to be a preset-degree low level, based on whether the cross point (X) is formed as an intersection point between (i) the self-vehicle predicted path ($P_H$) provided by the self-vehicle path predictor, and (ii) the nearby vehicle predicted path ($P_R$), without performing a determination by the node determiner.

In another aspect of the present disclosure, a drive support system, including a plurality of detectors, a drive support apparatus in communication with the plurality of detectors, the drive support apparatus including a receiver receiving a navigation signal from a satellite, a communication device performing communication with one of another vehicle or a roadside device, and a controller communicating with the receiver and the communication device, the controller configured to include a drive support provider providing a drive support for a driver of a self-vehicle, a self-vehicle positioner sequentially determining a current position of the self-vehicle the drive support apparatus by sequentially obtaining a position that has been determined by receiving a navigation signal from a navigation satellite of a satellite navigation system, a reliability determiner sequentially determining a reliability of a map matching that matches the current position of the self-vehicle onto a road on a map, based on a comparison between a locus of the current position of the self-vehicle and a road shape, a self-vehicle path predictor providing a self-vehicle predicted path ($P_H$) based on the current position and a travel direction of the self-vehicle, a nearby vehicle path predictor providing a nearby vehicle predicted path ($P_R$) by obtaining, from a vehicle-to-vehicle communicator of the self-vehicle, predicted path information that predicts a path of a nearby vehicle, based on the current position and the travel direction of the nearby vehicle traveling nearby the self-vehicle, an area definer defining a determination area (B) to include a cross point (X) between the self-vehicle predicted path ($P_H$) and the nearby vehicle predicted path ($P_R$), when the cross point (X) is formed as an intersection of the self-vehicle predicted path ($P_H$) and the nearby vehicle predicted path ($P_R$), an intersection node finder (S9) determining whether an intersection node of a road in the travel direction of the self-vehicle onto which the current position of the self-vehicle is map-matched by at least a preset-degree high reliability that is determined by the reliability determiner, the intersection node of the road representing an intersection in road map information, and a node determiner determining whether the intersection node determined by the intersection node finder is found in the determination area that is defined by the area definer. The drive support provider provides the drive support in a suppressed level that is suppressed, when the node fails to find the intersection node in the determination area, the suppressed level in which the drive support is provided to the driver is in a suppressed manner when compared to the drive support at a time when the intersection node is found in the determination area. Also, the drive support provider determines whether to provide the drive support, when the reliability of map matching is determined by the reliability determiner to be a preset-degree low level, based on whether the cross point (X) is formed as an intersection point between (i) the self-vehicle predicted path ($P_H$) provided by the self-vehicle path predictor, and (ii) the nearby vehicle predicted path ($P_R$), without performing a determination by the node determiner.

According to the present disclosure, when the reliability of the map matching is high, the intersection node is determined, i.e., identified, as a first node that is going to be encountered and passed firstly by the self-vehicle in a travel direction of the self-vehicle on the road onto which the current position of the self-vehicle is being map-matched, and the identified intersection node is then determined as to whether it is inside the determination area.

The determination area is an area that is defined to include the cross point between the self-vehicle predicted path and the nearby vehicle predicted path, in case that such a cross point is determined/predicted as existing. That is, when the intersection node is found in the determination area, the self-vehicle and the nearby vehicle are expected to pass through the same intersection. On the other hand, when no intersection node is found in the determination area, the self-vehicle and the nearby vehicle are not expected to pass through the same intersection.

A collision between the two vehicles usually happens in an intersection. In other words, even when a cross point between the self-vehicle predicted path and the nearby vehicle predicted path exists, in case that such a cross point is not located in an intersection, a possibility of collision between the self-vehicle and the nearby vehicle is low. That is, by determining whether the intersection node is found in the determination area, the possibility of collision between the self-vehicle and the nearby vehicle is determinable, i.e., whether a collision possibility between the two vehicles is high or low is determinable.

When the intersection node is not found in the determination area, it is highly possible that the cross point is not located in an intersection corresponding to the intersection node, and when the cross point is not located in an intersection, the collision possibility of the self-vehicle and the nearby vehicle is low. Thus, when no intersection node is found in the determination area, the drive support provider sets a level of drive support to a suppressed level in which the drive support is provided for the driver in a suppressed manner than the drive support for an intersection-found case, i.e., than when the intersection node is found in the determination area.

Therefore, in the present disclosure, when the reliability of the map matching is high, whether to suppress the drive support is determined by utilizing the road map information. In such manner, an unnecessary drive support is prevented from being provided for the driver of the self-vehicle.

On the other hand, when the reliability of the map matching is low, the node determiner does not perform a determination. That is, when the reliability of the map matching is low, whether to suppress the drive support is not determined by utilizing the road map information. Then, whether to provide the drive support is determined based on whether any cross point is formed between (i) the self-vehicle predicted path from the self-vehicle path predictor, which is derived from the current position and the travel direction of the self-vehicle determined by the self-vehicle positioner, and (ii) the nearby vehicle predicted path. In such manner, a lack of drive support, i.e., a suppression of the drive support, in a drive support required situation is prevented.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
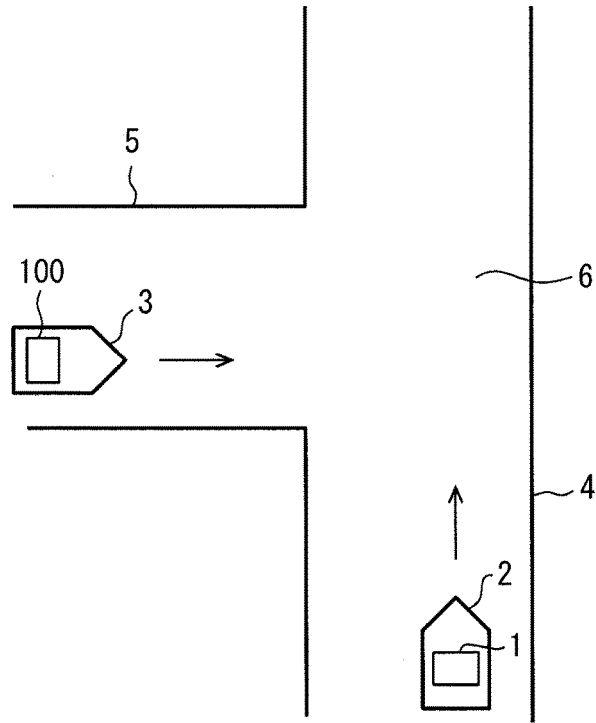
FIG. 1 is an illustration of a travel state of two vehicles respectively having a drive support system disposed thereon in an embodiment of the present disclosure.

Hereafter, an embodiment of the present disclosure is described based on the drawing.

As shown in FIG. 1, a vehicle (henceforth, self-vehicle) 2 carrying a drive support system 1 travels on a road 4. In a state shown in FIG. 1, another vehicle (henceforth, nearby vehicle) 3 exists at the proximity of the self-vehicle 2. The nearby vehicle 3 travels on an intersection road 5 that intersects the road 4 on which the self-vehicle 2 travels, toward an intersection 6.

The nearby vehicle 3 has a drive support system 100 disposed thereon. Although the numeral 100 is different from the numeral 1, the drive support system 100 has the same configuration as the drive support system 1.

[Configuration of the Drive Support System 1]

Figure 2:
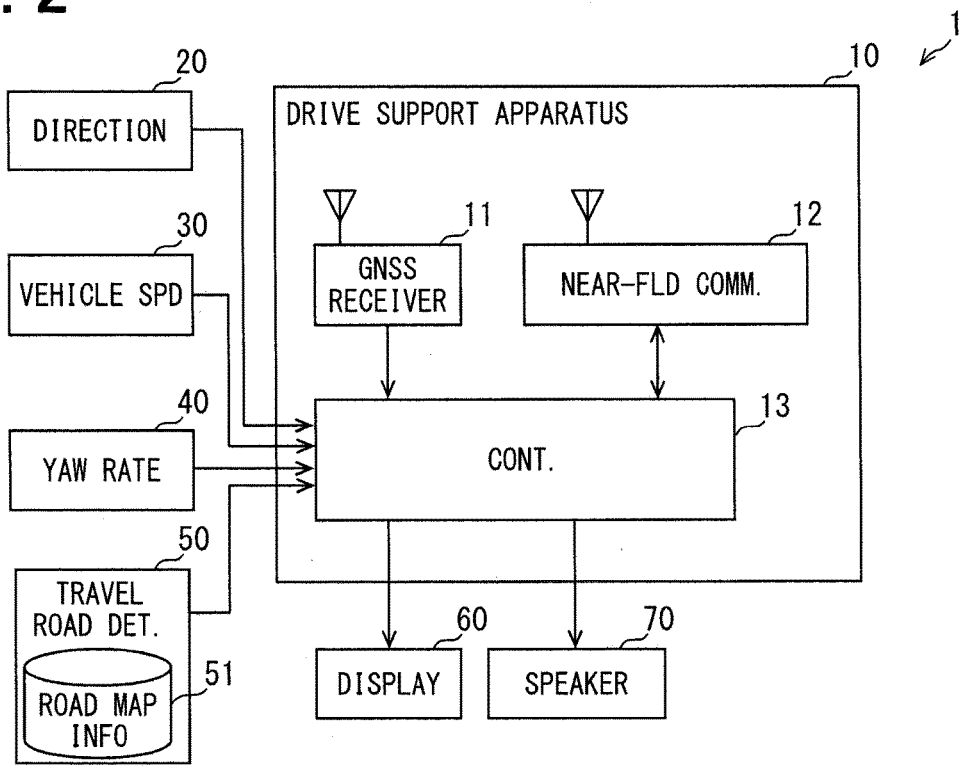
FIG. 2 is a block diagram of the drive support system.

As shown in FIG. 2, the drive support system 1 is provided with a drive support apparatus 10, a direction sensor 20, a vehicle speed sensor 30, a yaw rate sensor 40, a travel road determiner 50, a display 60, and a speaker 70.

The drive support apparatus 10 is provided with a GNSS receiver 11, a near-field communicator 12, and a controller 13.

The GNSS receiver 11 receives a navigation signal transmitted from a navigation satellite of a Global Navigation Satellite System (GNSS) which is a satellite navigation system, and sequentially computes a current position based on the received navigation signal.

The near-field communicator 12 is a communication device for performing the vehicle-to-vehicle communication and the road-to-vehicle communication between, and performs such communication by using the electric wave of the predetermined frequency bands, e.g., 5.9 GHz band and 700 MHz band, with a near-field communication device disposed on the other vehicle and with a roadside device installed on a side portion of the road.

Since the near-field communicator 12 can perform the vehicle-to-vehicle communication, it is equivalent to a vehicle-to-vehicle communicator in the claims.

Figure 5:
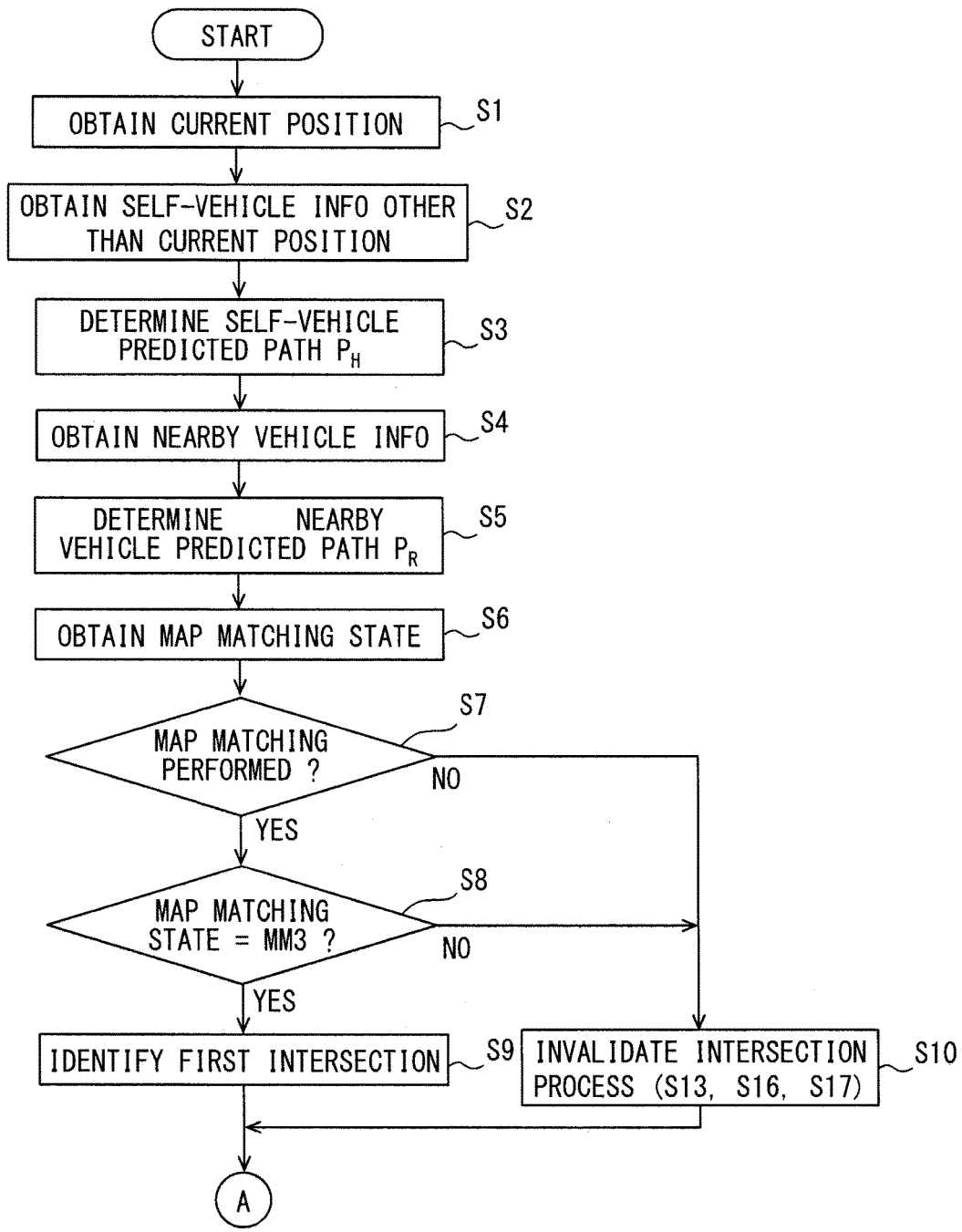
FIG. 5 is a flowchart of a process performed by a controller in FIG. 2.
Figure 6:
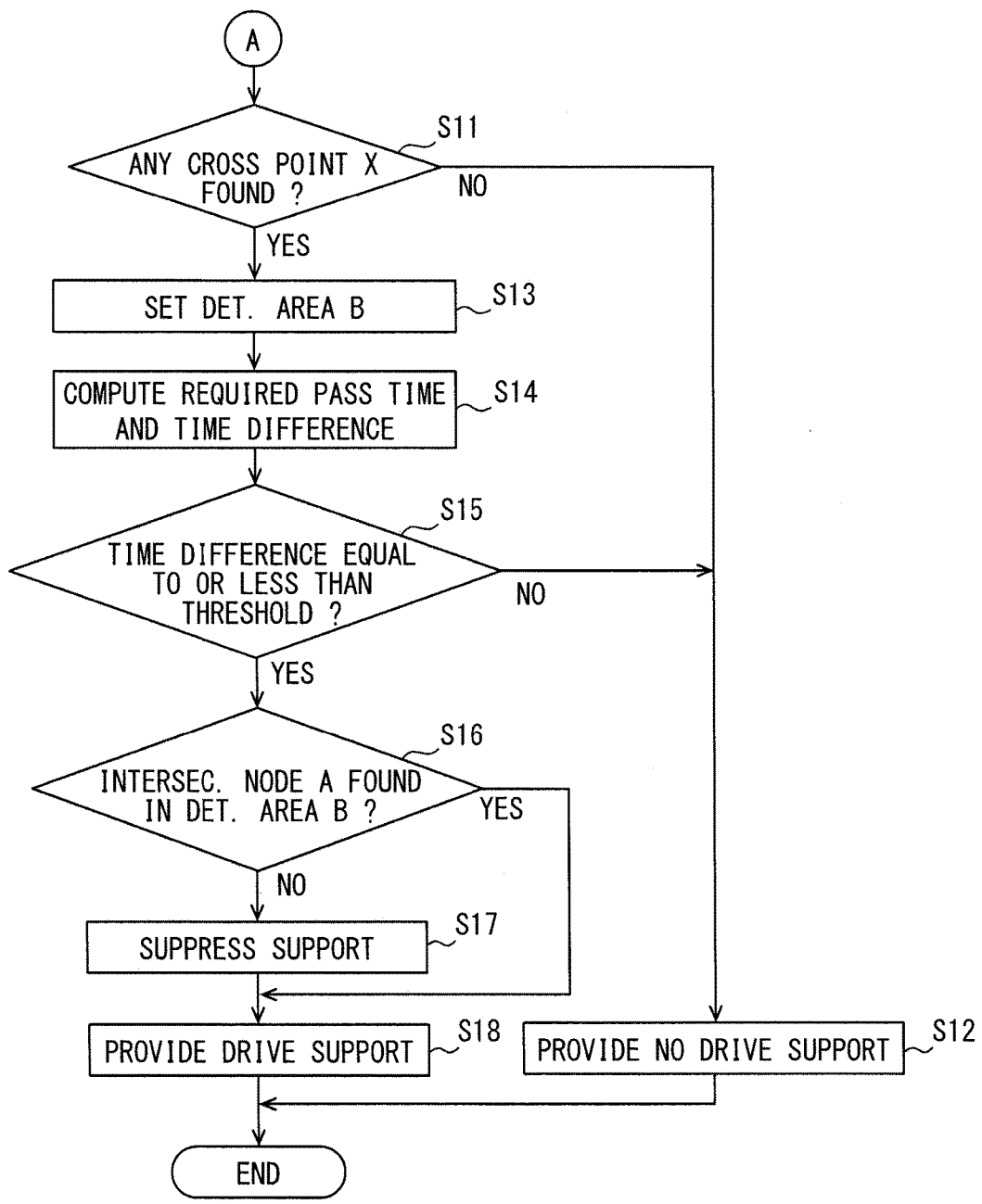
FIG. 6 is a flowchart of a process performed subsequently to the one in FIG. 5 by the controller in FIG. 2.

The controller 13 is a computer provided with Central Processing Unit (CPU), Read-Only Memory (ROM), Random-Access Memory (RAM), etc., and the CPU performs the processes embodied by data structure or modules shown in FIG. 5 and FIG. 6 by executing the stored program that is stored by a non-transitory tangible storage medium (e.g., ROM) with a help of a temporary storage provide by RAM. When the processes shown in FIG. 5 and FIG. 6 are performed, the method corresponding to the program is performed.

Further, the controller 13 sequentially transmits self-vehicle information mentioned later from the near-field communicator 12 to a nearby field of the self-vehicle 2, besides performing the processes shown in FIG. 5 and FIG. 6.

The direction sensor 20 is a sensor for detecting an absolute direction of the self-vehicle 2, for example, which may be, for example, a magnetic field sensor.

The vehicle speed sensor 30 sequentially detects a vehicle speed of the self-vehicle 2.

The yaw rate sensor 40 detects a yaw rate, i.e., an angular velocity of rotation of the self-vehicle 2 about a vertical axis the self-vehicle 2.

The travel road determiner 50 is provided with a memory 51 that memorizes the road map information and a current position detector, (not illustrated), and sequentially identifies a road on which the self-vehicle 2 travels.

The road map information memorized by the memory 51 represents the road by using node information and link information. The node information is information about a node, and the node represents a nodal point for representing road related information on the map. That is, an intersection of two or more roads is represented as a node in the road map information. Hereafter, a node representing an intersection is designated as an intersection node A.

The link information is information about a link which is a section between two nodes, i.e., a connection connecting one node with the other node.

As the travel road determiner 50, a navigation device may be used, for example. The current position detector of the travel road determiner 50 performs map matching, just like a publicly-known navigation device.

In a map matching process, (i) a travel locus of the vehicle generated from plural current positions that have been sequentially detected by using the GNSS receiver, and (ii) a road shape on the map are compared, and the current position of the self-vehicle 2 is corrected onto, i.e., is matched to, a road represented on the map, i.e., represented by the road map information.

Since the road map information represents roads by using the links, the current position of the self-vehicle 2 is corrected by the map matching onto a certain link.

The travel road determiner 50 sequentially determines a map matching state. In the present embodiment, the map matching state is set to one of the four states shown in FIG. 3.

MM0 is a state in which no map matching is performed. In other words, MM0 is a not-yet-matched state in which no matching link is determined for the current position of the self-vehicle 2. For example, when no similar road shape similar to the travel locus of the self-vehicle 2 is found at the proximity of the current position that is detected by using the GNSS receiver, the map matching state is determined as MM0.

MM1 is a plural candidates state, in which two or more link candidates are found for, i.e., are considered as matchable to, the current position of the self-vehicle 2.

When the self-vehicle 2 travels on one of the two parallel roads that exist on the same height surfaces of the ground, or when the self-vehicle 2 travels on one of the two different height roads, e.g., on one of the ground road and the raised road above the ground road such as a skyway, the map matching state is determined as MM1.

MM2 is a transition state, i.e., a state of transition between two matching states, i.e., (a) a transition state in which a non-map-matching state is transiting to a map-matched state, or (b) a possibly-transiting state in which one link in a subject intersection to which the vehicle position has been matched before the vehicle enters into the subject intersection is considered as possibly transiting to another link in the subject intersection.

The situation (a) may more practically be described as a state in which the travel locus is too short for the matching with the road shape on the map, such as having a very short travel locus of the vehicle just after exiting from a parking garage. The situation (b) may more practically be described as a state of transition (i) from one link to which the current position of the vehicle before entering an intersection is matched (ii) to the other link as the vehicle travels in the intersection, which may also be described as a too-short travel locus after an intersection node. When the map matching state is MM2, it may be considered as the reliability of the map matching being insufficient (i.e., low reliability) at the moment. MM2 is equivalent to a transition state in the claims.

Figures 3, 4:
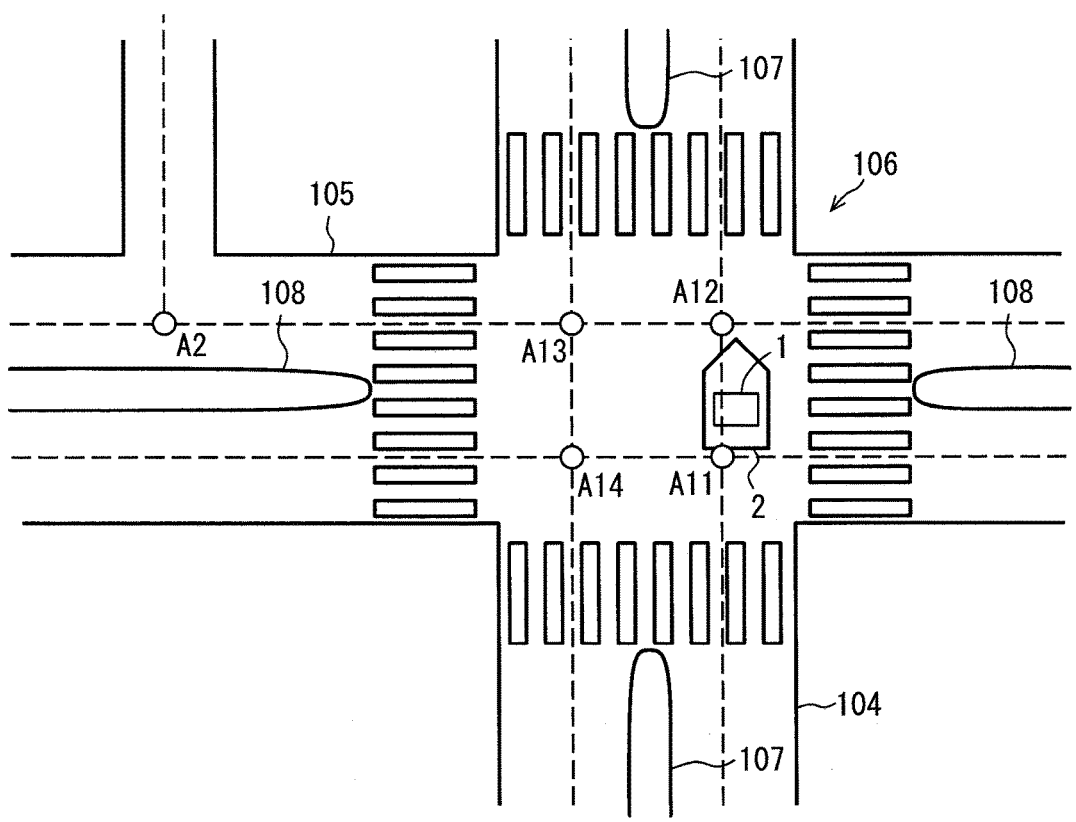
FIG. 3 is an illustration of how a state of a map matching is determined by a travel road determiner.
FIG. 4 is an illustration of one of four map matching states.

For example, as shown in FIG. 4, it is assumed that the self-vehicle 2 is located in the intersection 106 when the road 104 and the road 105 cross with each other.

Both of the road 104 and the road 105 are wide roads respectively having a median strip 107 and a median strip 108. The intersection 106 is represented by four intersection nodes A11, A12, A13, and A14 which may collectively be designated as an intersection node A. In the situation shown in FIG. 4, the travel locus after the intersection node A11 is short, even though the travel locus of the self-vehicle 2 has already passed through the intersection node A11. Therefore, the map matching state is set to MM2.

MM3 is a matched state in which the current position of the self-vehicle 2 is matched onto one link in a determined manner. The above-described map matching states respectively represent, in other words, various degrees of the reliability of map matching.

When the map matching state is MM3, the reliability of the map matching is high, i.e., the map matching result is highly reliable, and when the map matching state is one of MM0, MM1, and MM2, the reliability of map matching is low, i.e., the map matching result is less reliable.

The display 60 is arranged at a position which is visible from the driver's seat of the self-vehicle 2, and displays drive support information for supporting the driver's operations, such as a warning about a nearby vehicle traveling nearby.

The speaker 70 outputs various sounds into the compartment of the self-vehicle 2.

[Process Performed by the Controller 13]

The controller 13 periodically performs the process (i.e., is configured or programmed to include or execute the following data structure or module) shown in FIG. 5 and FIG. 6 at a certain interval.

In Step ("Step" may be omitted hereafter) S1, the current position of the self-vehicle 2 is obtained from the GNSS receiver 11. The current position is represented by latitude, longitude, and altitude. Since the controller 13 can determine the current position of the self-vehicle 2 by the process of S1, Step S1 is equivalent to a self-vehicle positioner in the claims.

In S2, self-vehicle information other than the current position is obtained.

The self-vehicle information other than the current position more specifically includes an absolute direction, a vehicle speed, and a yaw rate of the self-vehicle 2, and these information items are obtained from the direction sensor 20, the speed sensor 30, and the yaw rate sensor 40, respectively.

The self-vehicle predicted path $P_H$ is determined in S3.

The self-vehicle predicted path $P_H$ is determined as, i.e., predicts, a future travel path of the self-vehicle 2.

The self-vehicle predicted path $P_H$ in the present embodiment is a straight line extending from the current position obtained in S1 and extending in an absolute direction obtained in S2.

Since the self-vehicle predicted path $P_H$ in the present embodiment is a straight line extending in the absolute direction obtained in S2, the travel direction of the self-vehicle 2 is determined as the absolute direction obtained in S2. Step S3 is thus equivalent to a self-vehicle path predictor in the claims.

In S4, nearby vehicle information is obtained from the near-field communicator 12.

As mentioned above, the self-vehicle 2 sequentially transmits the self-vehicle information from the near-field communicator 12. Further, the drive support system 100 disposed in the nearby vehicle 3 is provided with the same configuration as the drive support system 1 disposed in the self-vehicle 2. Therefore, the drive support system 100 disposed in the nearby vehicle 3 also sequentially transmits the same kind of information as the self-vehicle information.

The information transmitted by the drive support system 100 is, from a viewpoint of the drive support system 1, the nearby vehicle information.

When the nearby vehicle 3 exists in the communication range of the near-field communicator 12 of the self-vehicle 2, the near-field communicator 12 of the self-vehicle 2 can receive the nearby vehicle information transmitted from the drive support system 100 of the nearby vehicle 3.

When the near-field communicator 12 of the self-vehicle 2 could obtain the nearby vehicle information, the nearby vehicle information is received in S4. The nearby vehicle information includes the current position, the absolute direction, the vehicle speed, and the yaw rate of the nearby vehicle 3.

The current position of the nearby vehicle 3 is determined just like the current position of the self-vehicle 2 based on the navigation signal.

In S5, the nearby vehicle predicted path $P_R$, which predicts the future travel path of the nearby vehicle 3 is determined.

The nearby vehicle predicted path $P_R$ in the present embodiment is a straight line extending in a direction of the absolute direction obtained in S4 on the basis of the current position obtained in S4. Step S5 is equivalent to a nearby vehicle path predictor in the claims, and the current position and the absolute direction obtained in S4 and used for the determination of the nearby vehicle predicted path $P_R$ are equivalent to predicted path information in the claims.

In S6, the map matching state is obtained from the travel road determiner 50, and the obtained map matching state is determined as the current map matching state.

As mentioned above, since the map matching state represents the reliability of the map matching, Step S6 is equivalent to a reliability determiner in the claims.

An illustration in FIG. 2 shows a configuration in which the travel road determiner 50 is connected to the drive support apparatus 10. However, the drive support apparatus 10 is operable without connection to the travel road determiner 50. When the travel road determiner 50 is not connected to the drive support determiner 50, the map matching state cannot be obtained by performing S6.

In S7, it is determined whether the map matching of the self-vehicle 2 is performed based on the processing result of S6.

When the map matching state obtained from the travel road determiner 50 is MM0, or when the map matching state has not been obtained, the determination of S7 branches to NO. When the determination of S7 is NO, the process proceeds to S10 that is mentioned later.

On the other hand, when MM1, MM2, or MM3 is obtained from the travel road determiner 50 as the map matching state, the determination of S7 branches to YES. When the determination of S7 is YES, the process proceeds to S8.

In S8, it is determined whether the map matching state is MM3.

When the determination is NO, the process proceeds to S10, and when the determination is YES, the process proceeds to S9.

In S9, a first intersection, i.e., a nearest intersection, in the travel direction of the self-vehicle 2 is identified "as a node" on the road 4 on which the self-vehicle 2 travels. That is, when the self-vehicle 2 travels on the road 4, an intersection that is first encountered by the self-vehicle 2 is identified in S9. The process in S9 is a process that obtains from the travel road determiner 50 the information on the intersection node A representing an intersection concerned. Step S9 is equivalent to an intersection node finder in the claims.

When performing S9, the travel road determiner 50 sets the map matching state to MM3. Therefore, the information on the intersection node A obtained is S9 is reliable. When S9 is performed, the process proceeds to S11 shown in FIG. 6.

On the other hand, S10 is performed when the determination of S7 or S8 is NO. In S10, an intersection process is invalidated. The intersection process is a process using the intersection node A, i.e., is a process in S13, S16, and S17, which are mentioned later. When S10 is performed, the process proceeds to S11 in FIG. 6. without performing S9. That is, when S10 is performed, the process proceeds to S11, without obtaining the first intersection node A.

The reason of why the first intersection node A needs not be obtained when S10 is performed is that the reliability of the map matching is low when S10 is performed, i.e., it is highly possible that the map matching result is wrong. That is, matching of the current position of the self-vehicle 2 in such situation is matching such position to, most likely, a different road that is different from a currently-traveled road that is actually traveled by the self-vehicle 2 at the moment.

In S11, it is determined whether any cross point X is found as a cross point between the self-vehicle predicted path $P_H$ determined in S3 and the nearby vehicle predicted path $P_R$ determined in S5.

When it is determined that no cross point X exists, the process proceeds to S12. In S12, it is determined that no drive support is provided. Note that when no drive support is provided, a drive support level that is described in S18 later will be determined as a drive support level lv1.

When S12 is performed, the process shown in FIG. 5 and FIG. 6 is finished. On the other hand, when it is determined that the cross point X is found, i.e., exists, the process proceeds to S13. However, when the intersection process is invalidated in S10, S13 is skipped and the process proceeds to S14.

The determination area is set up in S13.

Figure 7:
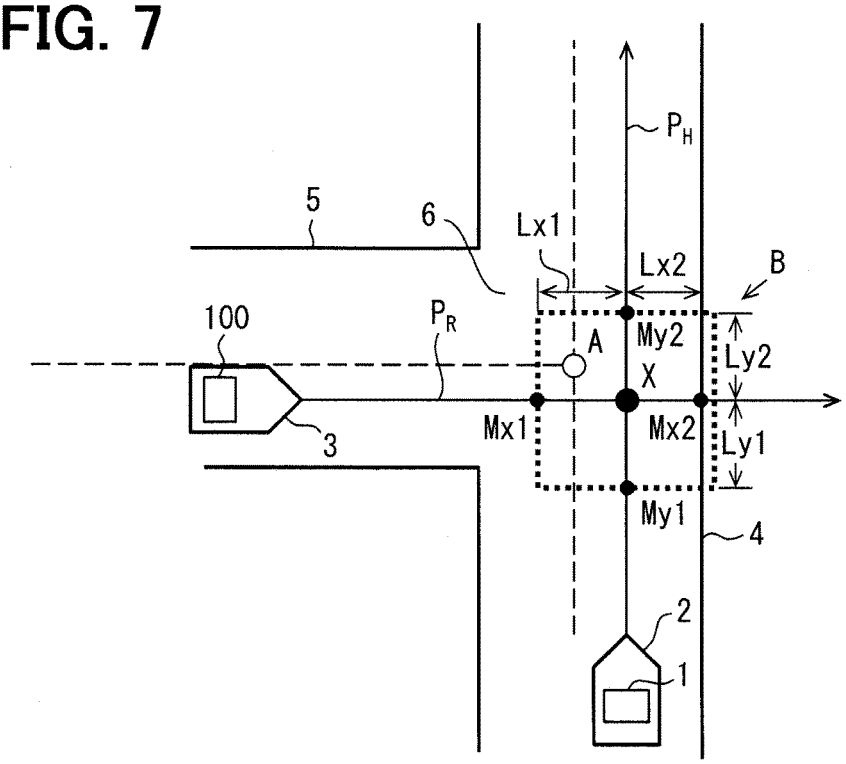
FIG. 7 is an illustration of how a determination area is set up in the embodiment of the present disclosure.

Step S13 is equivalent to an area definer in the claims. As shown in FIG. 7, a determination area B in the present embodiment is a square, with its center point defined as a cross point X, and four sides defined as parallel lines in parallel either with the self-vehicle predicted path $P_H$, or with the nearby vehicle predicted path $P_R$.

The determination area B is set up by the following method.

As shown in FIG. 7, a point My1 is set as a point away from the cross point X by a distance Ly1 on the self-vehicle predicted path $P_H$, first. Then, a point My2 is set as a point away from the cross point X by a distance Ly2 in an opposite direction from the point My 1 on the self-vehicle predicted path $P_H$.

Then, a point Mx1 is set as a point away from the cross point X by a distance Lx1 on the nearby vehicle predicted path $P_R$, and a point Mx2 is set as a point away from the cross point X by a distance Lx2 in an opposite direction from the point Mx1 on the nearby vehicle predicted path $P_R$.

Thus, the determination area B is defined as a parallelogram, with the four sides of the square respectively pass one of the four points Mx1, Mx2, My1, My2, and a pair of two parallel sides is in parallel with the self-vehicle predicted path $P_H$ or with the nearby vehicle predicted path $P_R$.

Therefore, as shown in FIG. 7, when setting up the determination area B in the above-described manner, when the self-vehicle predicted path $P_H$ and the nearby vehicle predicted path $P_R$ lie at a right angle, i.e., perpendicular to each other, the determination area B is defined as a rectangle.

However, when the self-vehicle predicted path $P_H$ and the nearby vehicle predicted path $P_R$ do not intersect perpendicularly, the determination area B is defined as a parallelogram with its four corners respectively having a non-right angle.

The distances Ly1, Ly2, Lx1, and Lx2 can be individually set up, i.e., may be set respectively differently, and each of the distances Ly1, Ly2, Lx1, and Lx2 is set up in advance.

As for the size of the determination area B which is determined by the distances Ly1, Ly2, Lx1, and Lx2, it may be preferably set to a value not greatly exceeding the size of the intersection 6. The reason why the size of the determination area B should not exceed the size of the intersection 6 is that the determination area B is used as a reference for a determination of whether the intersection node A is included in the determination area B.

Therefore, in the present embodiment, the length of each of the sides that are in parallel with the nearby vehicle predicted path $P_R$ is set to a value of 5 to 6 meters, which may be a road width having a bi-directional traffic with single traffic lane in each of the both traffic directions, based on appropriately-set values of Lx1 and Lx2. Further, in the present embodiment, the length of each of the sides that are in parallel with the self-vehicle predicted path $P_H$ is also set to the value of the sides that are in parallel with the nearby vehicle predicted path $P_R$.

In S14 subsequent to S13, a required pass time required for the self-vehicle 2 to pass through the cross point X and a required pass time taken for the nearby vehicle 3 to pass through the cross point X are computed, respectively.

In order to compute the required pass time of the self-vehicle 2, the distance from the current position of the self-vehicle 2 to the cross point X is computed first, based on the current position of the self-vehicle 2 and the coordinates of the cross point X. Then, by dividing the computed distance by the current vehicle speed of the self-vehicle 2, the required pass time of the self-vehicle 2 is computed. The required pass time of the nearby vehicle 3 is computed in the same manner as the required pass time of the self-vehicle 2.

Then, a time difference between the required pass time of the self-vehicle 2 and the required pass time of the nearby vehicle 3 is computed. Step S14 is equivalent to a time difference computer in the claims.

In S15, it is determined whether the time difference computed in S14 is equal to or less than a threshold set up in advance. The value of the threshold may be, for example, set to several seconds or the like, for a determination of collision possibility of the self-vehicle 2 and the nearby vehicle 3, when the self-vehicle 2 and the nearby vehicle 3 pass through the cross point X.

When the determination of S15 is NO, the process proceeds to S12 mentioned above. On the other hand, when the determination of S15 is YES, the process proceeds to S16. In case that the intersection process is invalidated in S10, Steps S16 and S17 are skipped and the process proceeds to S18.

Step S16, which is equivalent to a node determiner in the claims, determines whether there is, in the determination area B, any first intersection that has been identified in S9.

When the determination of S16 is NO, the process proceeds to S17, and when the determination of S16 is YES, the process proceeds to S18, without performing S17.

In S17, the drive support level is determined as a suppressed level in which the drive support level is more suppressed than the level of drive support performed in S18 after skipping S17. In the present embodiment, the drive support level determined in S17 is made to be lowered by two levels more than the drive support level to be performed in S18 without performing (i.e., after skipping) the process of S17.

That is, in other words, when S18 is performed, whether Step S17 has been performed or not matters. When S18 is reached after S17, the drive support level is lowered, i.e., is suppressed, by two levels more than the level when S18 is reached after S16 without performing S17.

The contents of the drive support level are described in the description of S18. When the drive support level is determined in S17, the process proceeds to S18.

The drive support is performed in S18. Steps S18, S17 and S12 are equivalent to a drive support provider in the claims.

The drive support performed in the present embodiment supports the driver of the self-vehicle 2 by outputting a warning sound from the speaker 70, for the warning of the nearby vehicle traveling/existing nearby, while displaying a possibility of collision with the nearby vehicle 3 on the display 60. The drive support level comes with plural levels in the present embodiment.

For example, four drive support levels may be set up.

In a drive support level lv4 which is the highest or most intensive support among the four levels, an image indicating a warning is displayed on the display 60, and a sound indicating a warning is outputted from the speaker 70.

In a drive support level lv3, an image of drawing an attention is displayed on the display 60, and, in addition to such an image, an attention calling sound may be output from the speaker 70.

In a drive support level lv2, an image indicating a detection of the nearby vehicle 3 is displayed on the display 60.

In a drive support level lv1, no drive support is provided.

The number of levels, and the contents of the drive support provided in each of those levels, are not limited to the above-mentioned numbers and contents.

When the process proceeds to S18 without performing S17, either the drive support level lv4 or the drive support level lv3 described above is performed. Determining which one of the drive support levels lv4 or lv3 is to be performed may be based on whether the self-vehicle 2 is stoppable before the cross point X, if the driver of the self-vehicle 2 presses down a brake pedal by a maximum amount of stroke. When the self-vehicle 2 is not stoppable before the cross point X, even by the maximum amount of stroke of braking, the drive support level lv4 is performed, and, when the self-vehicle 2 is stoppable before the cross point X by such braking, the drive support level lv3 is performed.

An equation representing a relationship between a travel distance and a speed decrease of the self-vehicle 2 is pre-provided for a situation of maximum braking described above. The stoppability of the self-vehicle 2 before the cross point X by the maximum braking is determined by such an equation.

As mentioned above, in S17, the drive support level is lowered by two levels from the case of skipping S17 before proceeding to S18. Therefore, in case of performing S18 after performing S17, the drive support by the drive support level lv2 or by the drive support level lv1 is performed. Note that when the drive support level is determined as the level lv1, no drive support is performed.

Since Step S17 is performed when the determination of S16 branches to NO, Step S17 is performed when no intersection node A is found in the determination area B. Therefore, it is highly possible that the cross point X is not in the intersection.

The collision between two vehicles usually happens in an intersection. Therefore, even when the time difference is determined as equal to or less than the threshold in S15, there is little or no possibility of collision between the self-vehicle 2 and the nearby vehicle 3 when Step S17 is performed. Therefore, in S17, it is determined to provide the drive support in a suppressed support, by lowering the level of the drive support than the one performed in S18 that comes after skipping the process of S17.

However, the suppression of the drive support level by performing the process of S16 and S17 is allowable only when the first intersection node A is correctly identified as an intersection on the road that is traveled by the self-vehicle 2.

Therefore, in the present embodiment, when the map matching state is not MM3, the process of S16 and S17 is skipped. Further, when skipping the process of S16, Step S13, which is a process for setting the determination area B to be used in the process of S16, is also skipped.

By skipping the process of S16 and S17, the lowering of the drive support level despite that the cross point X is actually located in the intersection is prevented.

Example of Suppression of the Drive Support

Next, an example of suppression of the drive support by performing S17 is described.

Figure 8:
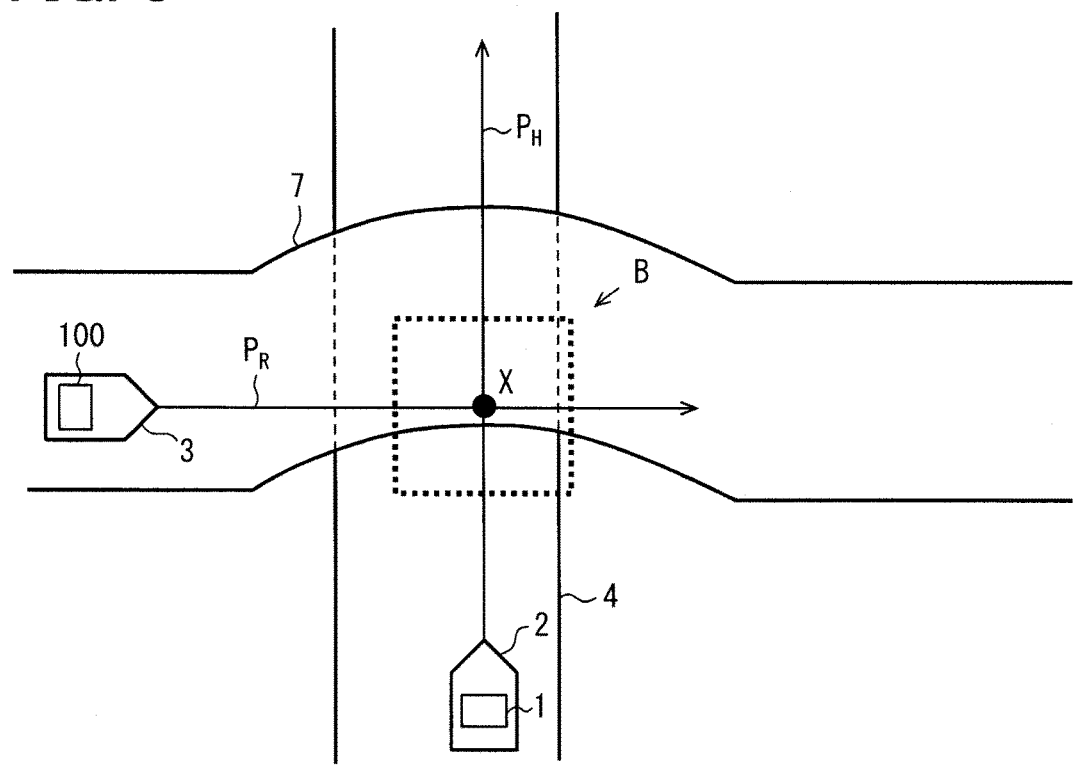
FIG. 8 is an illustration of a situation of how a drive support is suppressed.

In a situation shown in FIG. 8, for example, when the nearby vehicle 3 travels on a road 7 which passes above the road 4 on which the self-vehicle 2 travels, there is no possibility of collision between the self-vehicle 2 and the nearby vehicle 3. As shown in FIG. 8, the intersection node A does not exist in the determination area B.

Therefore, the drive support is suppressed due to a NO determination of S16, even when (i) the cross point X between the self-vehicle predicted path $P_H$ and the nearby vehicle predicted path $P_R$ exists, and (ii) the time difference between the required pass time of the self-vehicle 2 and the required pass time of the nearby vehicle 3 is equal to or less than the threshold.

Figure 9:
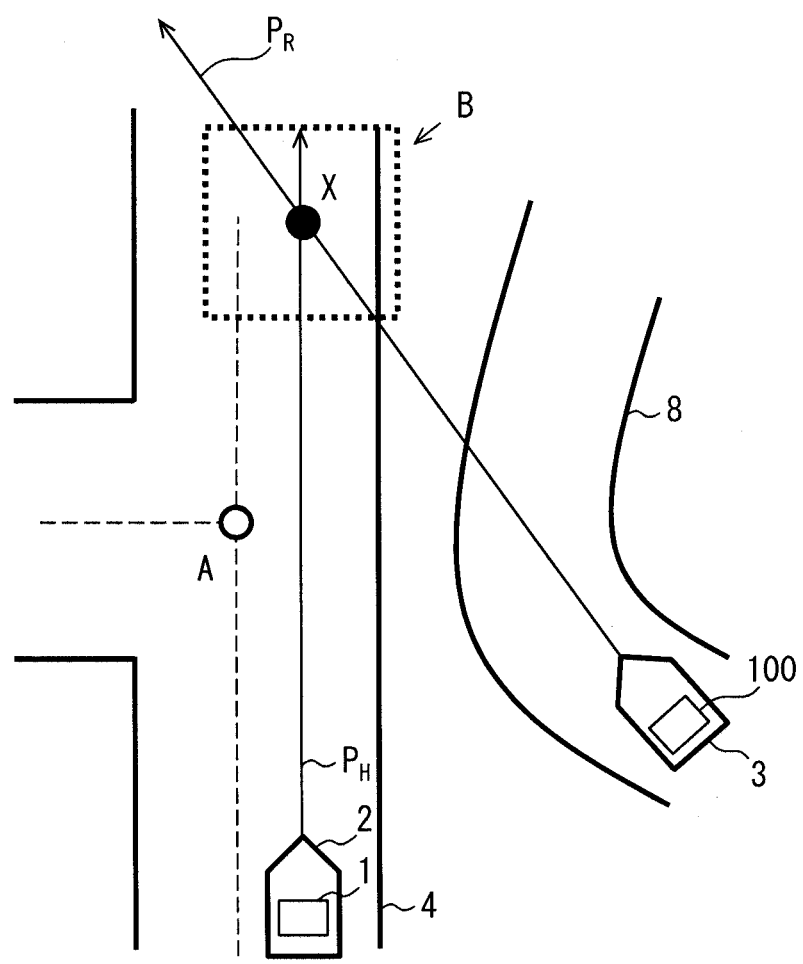
FIG. 9 is an illustration of another situation of how the drive support is suppressed.

Further, as shown in FIG. 9, in a situation in which the nearby vehicle 3 travels on a road 8 that comes near the road 4, but does not cross the road 4 on which the self-vehicle 2 travels, an unnecessary drive support is prevented, because in such a situation, the intersection node A will not likely be found in the determination area B.

Example of not Suppressing the Drive Support

Next, an example of not suppressing the drive support is described, which is a different situation from the one shown in FIG. 8 and FIG. 9.

Figure 10:
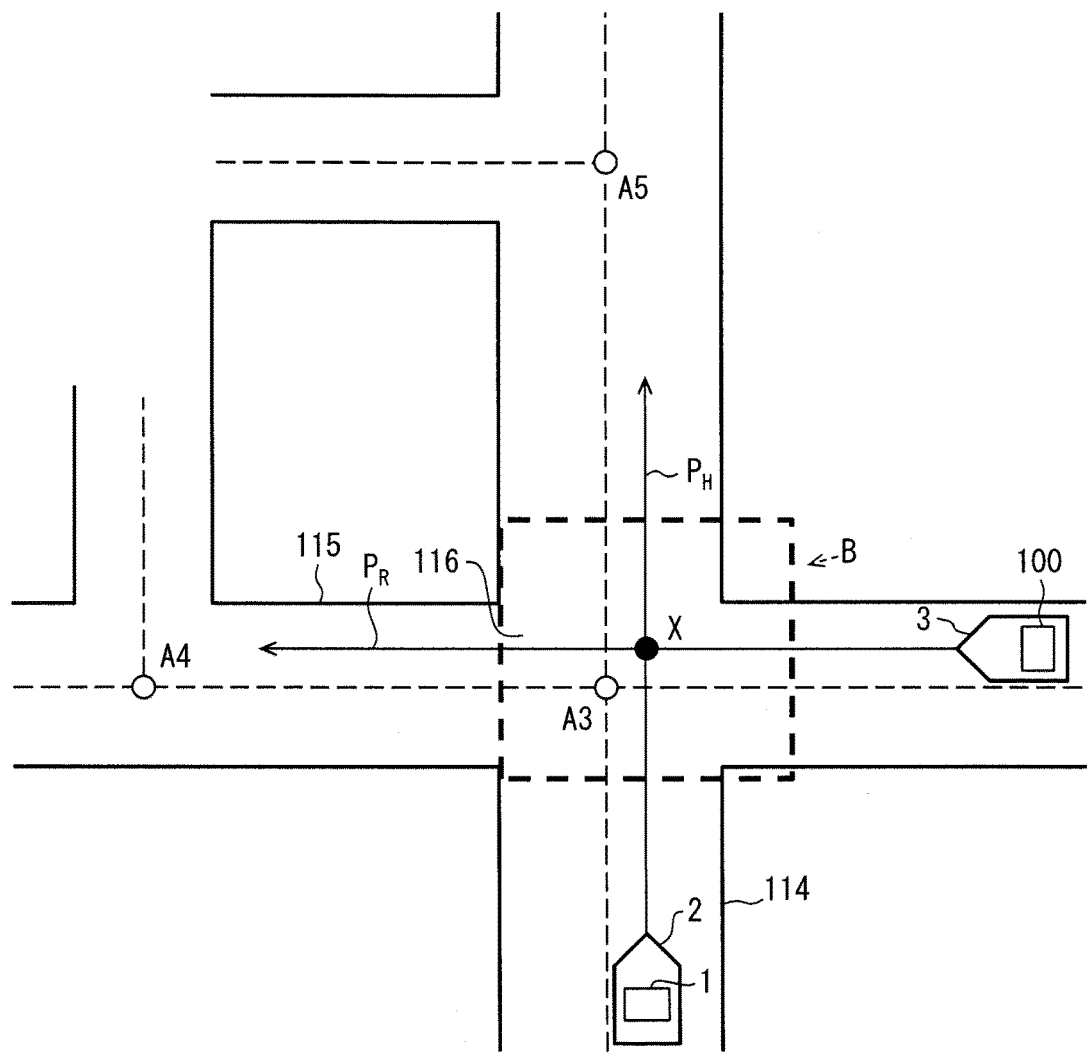
FIG. 10 is an illustration of a situation in which the drive support is not suppressed.

As shown in FIG. 10, it is assumed that (i) a road 114 and a road 115 cross each other at an intersection 116, and (ii) the self-vehicle 2 travels on the road 114 toward the intersection 116, and (iii) the nearby vehicle 3 travels on the road 115 toward the intersection 116.

The map matching state of the self-vehicle 2 is assumed as MM3.

In such a situation, an intersection node A3 is identified as the first intersection in S9.

Figure 11:
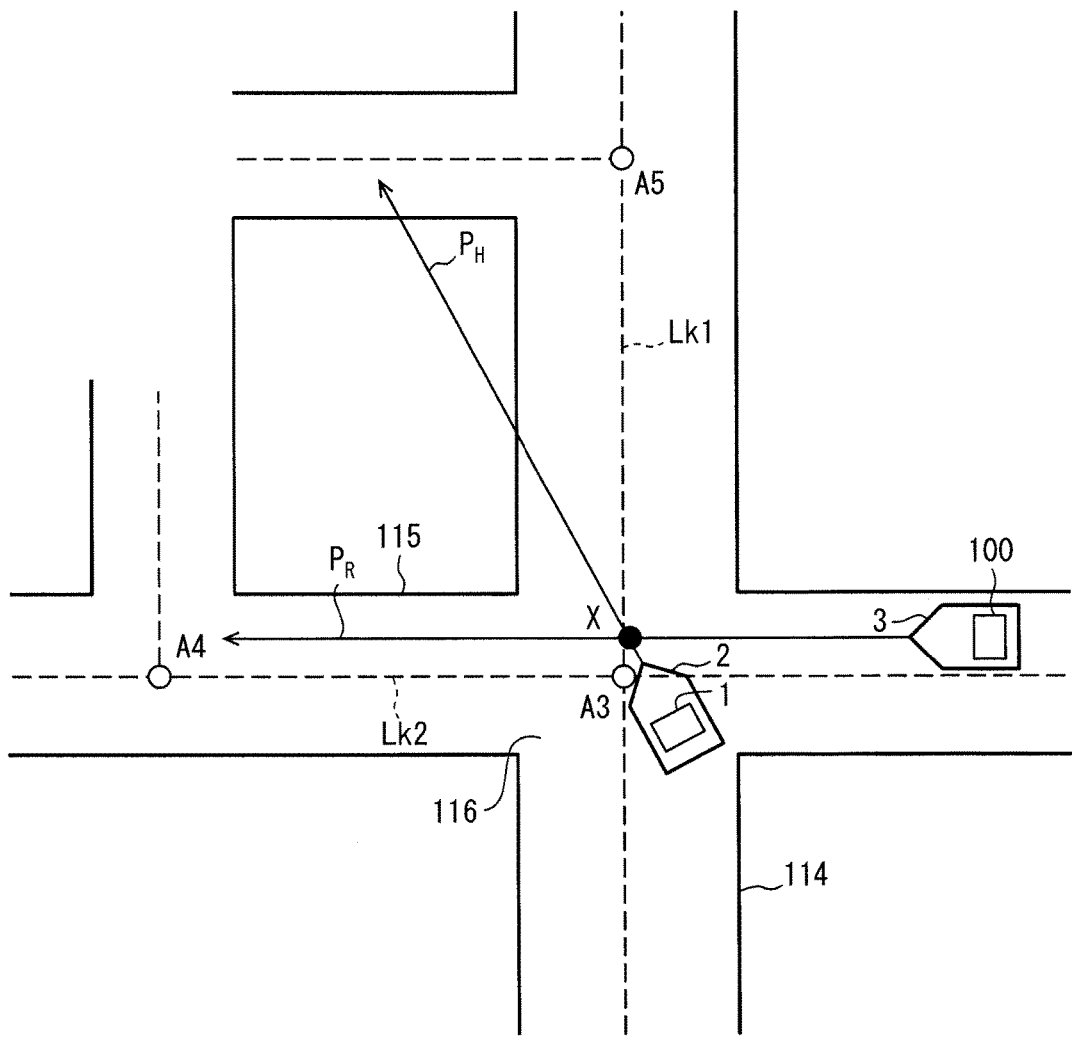
FIG. 11 is an illustration of a situation subsequent to the one shown in FIG. 10 in which a self-vehicle is in an intersection.

Then, it is further assumed that the self-vehicle 2 enters into the intersection 116, and the position of the self-vehicle 2 has moved to a position shown in FIG. 11. In such case, the map matching state is set to MM1 or MM2.

The reason of possibly setting the map matching state to MM1 is that the current travel direction of the self-vehicle 2 is not aligned with the road 114 nor with the road 115.

The reason of possibly setting the map matching state to MM2 is that, even though the actual position of the self-vehicle 2 is the one shown in FIG. 11, the position of the self-vehicle 2 may possibly be map-matched onto the link Lk1 or onto the link Lk2 in FIG. 11.

Since the map matching state is set to MM1 or MM2, the process proceeds to S10, and S13, S16, and S17 are invalidated.

As a comparative example, even when the map matching state is MM2, a situation of performing S9 instead of performing S10 is discussed below.

In such case, in S9, not the intersection node A3 of the intersection 116 in which the self-vehicle 2 is actually located, but an intersection node A4 or an intersection node A5 may be inadvertently identified as the intersection node A of the first intersection.

If such a wrong intersection identification is performed, in S16, based on a determination that the intersection node A5 or A4 identified as the first intersection node A is not found in the determination area B that is set up as centering on the cross point X, S17 will be performed, and the drive support will be suppressed.

However, in the present embodiment, when the map matching state is MM2 or MM1, a determination of whether the first intersection node A is found in the determination area B will not be performed by invalidating S13, S16, and S17. Therefore, an actual situation of FIG. 11 will not be wrongly determined as not having the first intersection node A in the determination area B, thereby preventing a suppression of the drive support.

Figure 12:
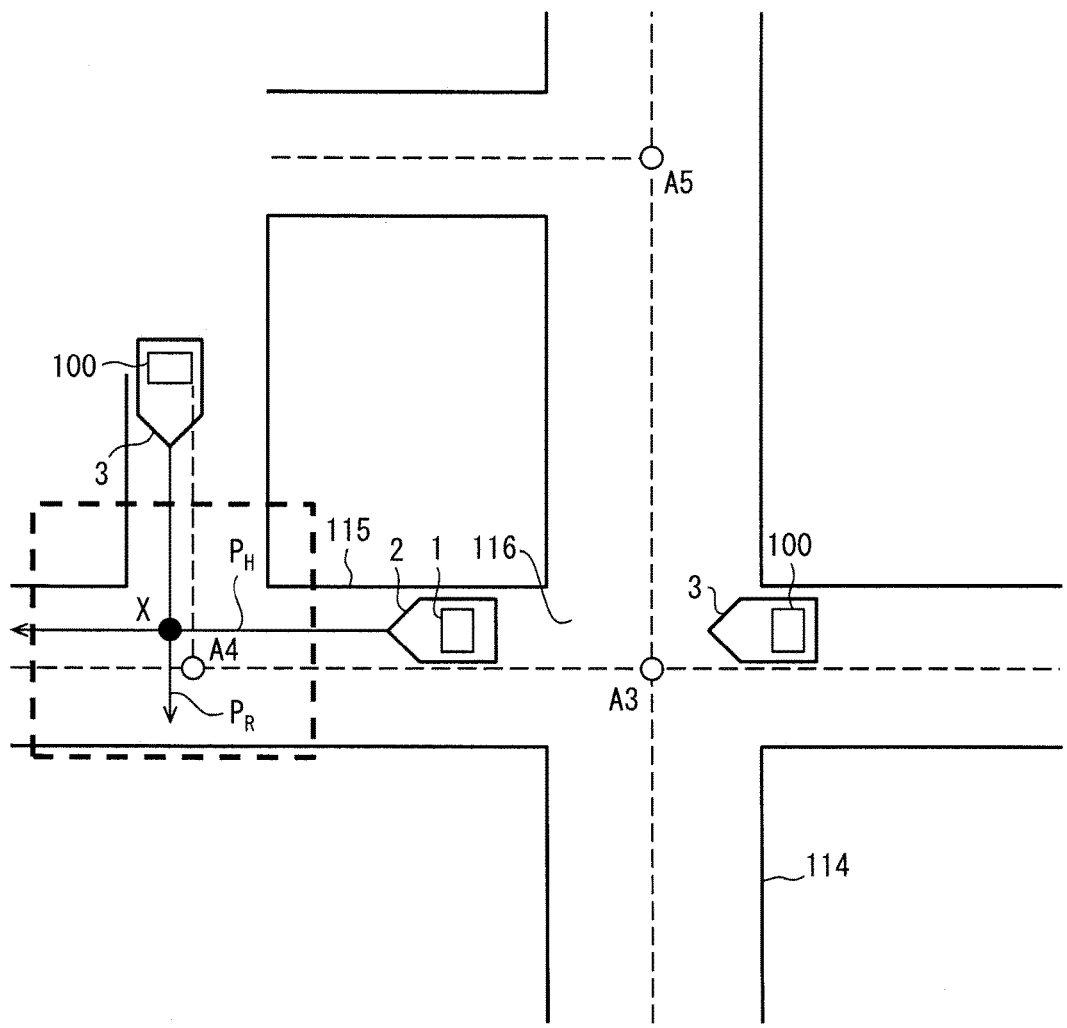
FIG. 12 is an illustration of a situation subsequent to the one shown in FIG. 11 in which the self-vehicle has exited from the intersection.

When the position of the self-vehicle 2 in FIG. 11 comes out of the intersection 116 as the self-vehicle 2 travels further to have a situation shown in FIG. 12, the map matching state is again set to MM3. Therefore, in the situation of FIG. 12, the intersection node A representing the first intersection is the intersection node A4. Thus, due to the determination of S16 branching to YES, the drive support is not suppressed.

Summary of the Embodiment

As mentioned above, in the above-described embodiment, when the map matching state is MM3, S9 is performed and the intersection node A representing the first intersection on the road on which the current position of the self-vehicle 2 is map-matched is identified. Then, whether the intersection node A is found in the determination area B is determined.

Since the determination area B is an area that is set up to include the cross point X when the cross point X is formed as an intersecting point between the self-vehicle predicted path $P_H$ and the nearby vehicle predicted path $P_R$, when the intersection node A is found in the determination area B, it is expected that the self-vehicle 2 and the nearby vehicle 3 pass through the same intersection.

On the other hand, when there is no intersection node A found in the determination area B, it is expected that the self-vehicle 2 and the nearby vehicle 3 do not pass through the same intersection.

The collision of the vehicles usually happens in an intersection. In other words, even when the cross point X at which the self-vehicle predicted path $P_H$ and the nearby vehicle predicted path $P_R$ cross with each other is found, such a cross point X is not in an intersection, there is little or no possibility of collision between the self-vehicle 2 and the nearby vehicle 3. That is, a determination of whether the intersection node A is in the determination area B is a determination of whether a possibility of collision between the self-vehicle 2 and the nearby vehicle 3 is high or low.

When no intersection node A is found in the determination area B, it is highly possible that cross point X is not in the intersection, and, when the cross point X is not in the intersection, it is recognized that a possibility of collision between the self-vehicle 2 and the nearby vehicle 3 is low.

Therefore, when there is no intersection node A found in the determination area B, S17 is performed and the drive support level is lowered than the level of the drive support provided when the intersection node A is found in the determination area B.

Therefore, in the present embodiment, when the map matching state is MM3, it is determined whether the road map information is utilized for the suppression of the drive support. In such manner, performing an unnecessary drive support is prevented.

On the other hand, when the map matching state is one of MM0, MM1, or MM2, S13, S16, and S17 are invalidated. Thereby, when the map matching state is one of MM0, MM1, and MM2, whether to suppress the drive support by utilizing the road map information will not be determined. Then, based on whether the cross point X is formed between the self-vehicle predicted path $P_H$ and the nearby vehicle predicted path $P_R$, whether to perform the drive support is determined.

Therefore, lack (i.e., suppression) of the drive support in a drive support required situation is prevented.

As described above as one embodiment of the present disclosure, the feature and advantage of the disclosed idea are apparent. However, the idea of the present disclosure is variously modifiable, not limited to the above-mentioned embodiment to implement and realize such an ideal form of the present disclosure, as long as the modification pertains to the technical scope of the present disclosure.

<Modification 1>

Although the determination area B has a square shape in the above-mentioned embodiment, the determination area B may also be rendered to have other shapes such as a round/circular shape, for example.

<Modification 2>

Although, in S3 of the above-mentioned embodiment, the self-vehicle predicted path $P_H$ is determined as the straight line extending along the absolute direction that is assumed as a travel direction of the self-vehicle 2.

However, as the travel direction of the self-vehicle 2 may be determined in a different manner. That is, the travel direction of the self-vehicle 2 may be, for example, determined as a tangential line of a circle/arc that has a turning radius R of the self-vehicle 2, at the current position of the self-vehicle 2 which is set as a point of contact of such tangential line, and such tangential line is aligned with a front-rear direction line of the self-vehicle 2. The front-rear direction line of the self-vehicle 2 represents an absolute direction of the self-vehicle 2. The turning radius R of the self-vehicle 2 may be computable by dividing the vehicle speed by the yaw rate.

<Modification 3>

Just like the self-vehicle 2, the nearby vehicle 3 may also be configured to have the same travel direction, which is tangential to the same circle/arc of having the turning radius of R, at the current position of the nearby vehicle 3 in S5. The yaw rate used to compute the radius R and to determine the path $P_R$ in the modification 3 is not used in the above-described embodiment for such purposes. Therefore, in the above-described embodiment, the nearby vehicle information needs not have the yaw rate.

<Modification 4>

Although the distances Ly1, Ly2, Lx1, and Lx2 of the four sides of the determination area B in the above-mentioned embodiment have predetermined values, the distances Lx1, Lx2 may be set to values that are determined according to the road width of the traveling road on which the self-vehicle 2 travels, or the number of lanes of such road. Further, the distances Ly1, Ly2 may be set to values that are determined in the same manner according to the traveling road of the nearby vehicle 3. Note that the word width, the number of lanes is included in the link information.

<Modification 5>

Instead of using the direction sensor 20, the travel direction of the self-vehicle 2 may be determined based on the change of the current positions of the self-vehicle 2 which are sequentially detected. Further, based on such change of the current positions, the yaw rate of the self-vehicle 2 may also be computed.

The same applies to the nearby vehicle 3. That is, the travel direction of the nearby vehicle 3 may be determined based on the change of the current positions of the nearby vehicle 3, which are sequentially detected, and the yaw rate of the nearby vehicle 3 may also be computed from the change of the current positions of the nearby vehicle 3, which are sequentially detected.

<Modification 6>

Acceleration may be used for computation of the required pass time. That is, in addition to the speed of the self-vehicle 2, acceleration of the self-vehicle 2 is obtained, and a speed change of the self-vehicle 2 is predicted from such acceleration of the self-vehicle 2, and, based on such prediction, the required pass time which is required for the self-vehicle 2 to pass through the cross point X is determined.

Further, in addition to the speed of the nearby vehicle 3, acceleration of the nearby vehicle 3 is obtained, and a speed change of the nearby vehicle 3 is predicted from such an acceleration of the nearby vehicle 3, and, based on such prediction, the required pass time which is required for the nearby vehicle 3 to pass through the cross point X is determined.

In such manner, the required pass time of the self-vehicle 2 and the required pass time of the nearby vehicle 3 can be more accurately computable.

<Modification 7>

Although it is determined whether the intersection node A of the first intersection would be in the determination area B in the above-mentioned embodiment, such determination may be modified to the following one. That is, it may be determined whether the intersection node A of not only the first intersection but also the second intersection, which is going to be passed by the self-vehicle 2 after the first intersection, would be in the determination area B.

<Modification 8>

Although, in the above-mentioned embodiment, the self-vehicle 2 determines the nearby vehicle predicted path $P_R$ by using the current position and the absolute direction transmitted from the nearby vehicle 3, the nearby vehicle 3 may sequentially compute the nearby vehicle predicted path $P_R$, and may sequentially transmit the computed path $P_R$. In such case, the nearby vehicle predicted path $P_R$ transmitted from the nearby vehicle 3 is equivalent to the predicted path information in the claims.

<Modification 9>

According to the above-mentioned embodiment, when a determination of S16 branches to NO and S17 is performed for lowering the drive support level, the drive support will not be performed, which is substantially the same as the process of S12 that is performed subsequent to a NO determination of S15.

Figure 13:
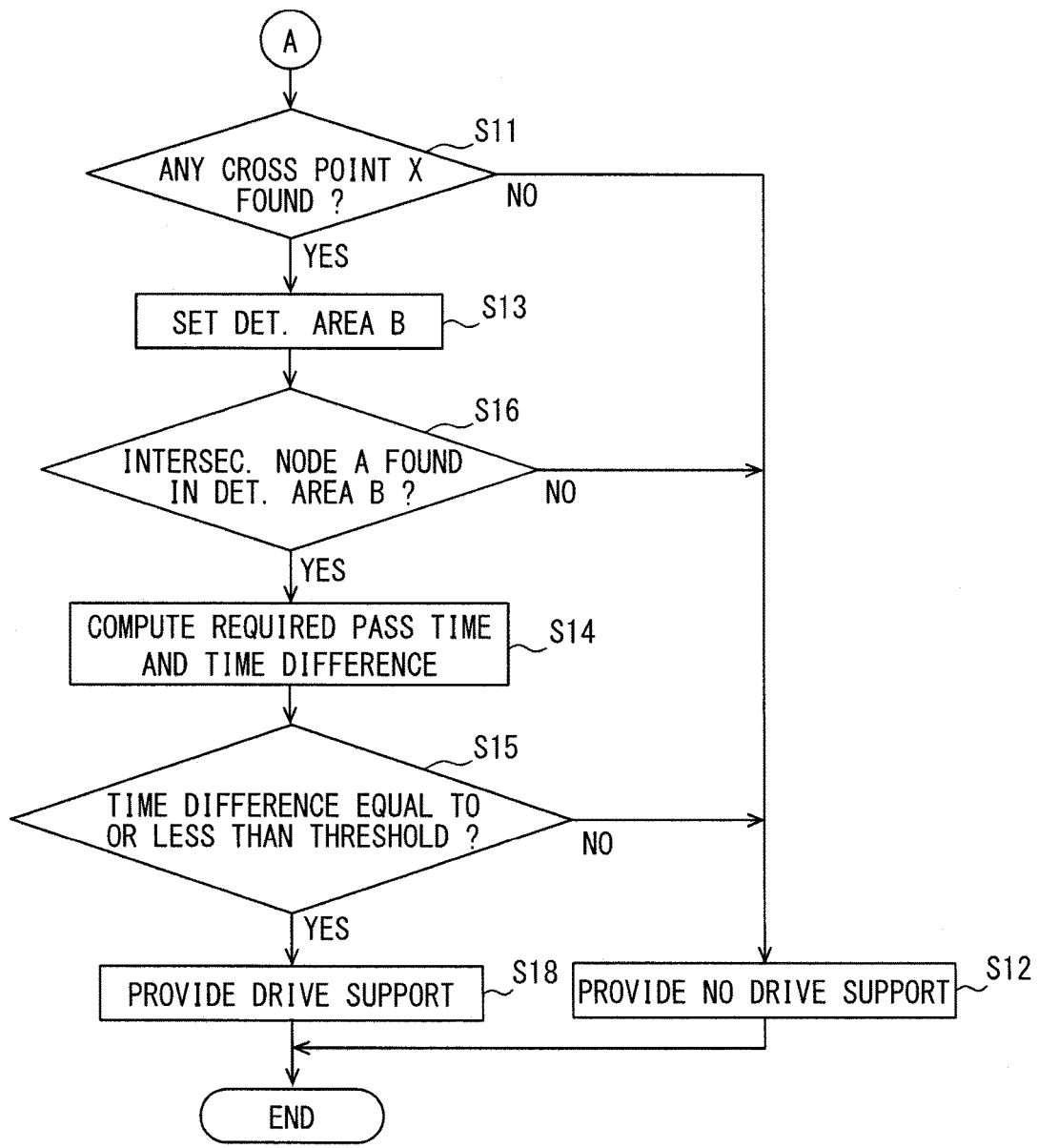
FIG. 13 is a flowchart of a process performed by the controller in place of the process in FIG. 6 in a modification of the present disclosure.

Therefore, S16 may be performed before performing S14 and S15, as shown in FIG. 13. Thereby, in case of a NO determination of S16, the process proceeds to S12, and, in case of a YES determination of S16, the process proceeds to S14 and S15.

In the modification 9, when it is determined that the intersection node A is not found in the determination area B, the drive support level is determined as the most suppressed level without using the time difference. Therefore, in the modification 9, the computation load is reduced because the time difference, as well as the required pass times need not be computed, when it is determined that no the intersection node A is found in the determination area B.

<Modification 10>

In the above-mentioned embodiment, processing in S14 and S15 may be omissible.

<Modification 11>

The drive support system 100 in the nearby vehicle 3 needs only to transmit the nearby vehicle information mentioned above. Therefore, the drive support system 100 needs not be provided with the travel road determiner 50.

<Modification 12>

According to the above-mentioned embodiment, the road the travel road determiner 50 performs the map matching, for the identification of the traveling road on which the self-vehicle 2 travels.

However, the drive support apparatus 10 may obtain the road map information about the nearby area of the self-vehicle 2 from the travel road determiner 50 based on the current position of the self-vehicle 2, and the controller 13 may perform the map matching. Further, when the drive support apparatus 10 is provided with the road map information (i.e., has the information stored therein), it is not necessary to obtain the road map information from the travel road determiner 50.

<Modification 13>

According to the above-mentioned embodiment, the near-field communicator 12 is used to perform the vehicle-to-vehicle communication.

However, in addition to the near-field communicator 12, or instead of having the near-field communicator 12, a wide-area wireless communication unit may be used as the vehicle-to-vehicle communicator.

<Modification 14>

According to the above-mentioned embodiment, the current position of the self-vehicle 2 is determined based on a computation of such position by the GNSS receiver 11, for the determination of the self-vehicle predicted path $P_H$.

However, the current position of the self-vehicle 2 used for the determination of the self-vehicle predicted path $P_H$ may be obtained as a current position after the map matching, when the map matching state is MM3.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A drive support apparatus for providing an alert in a subject vehicle, the drive support apparatus comprising:
    a controller, the controller configured to
        continuously determine a current position of the the subject vehicle by continuously obtaining a navigation signal from a navigation satellite of a satellite navigation system;
        determine a degree of reliability of a map matching that matches the current position of the subject vehicle onto a road on a map, based on a comparison between a locus of the current position of the subject vehicle and a road shape;
        determine a predicted path of the subject vehicle based on the current position and a travel direction of the subject vehicle;
        obtain a predicted path of a nearby vehicle from a vehicle-to-vehicle communicator in the subject vehicle;
        define a determination area around a cross point of the predicted path of the subject vehicle and the predicted path of the nearby vehicle when the cross point is within an intersection of a road on which the subject vehicle is traveling and a road on which the nearby vehicle is traveling;
        determine whether an intersection node of the road on which the subject vehicle is currently traveling is map-matched by at least a preset-degree of reliability; and
        determine whether the intersection node is within the determination area, wherein
    the controller is further configured to output the alert at different alert levels, and wherein
    the controller is further configured to output the alert at a level below a highest alert level when the intersection node is not within the determination area, and wherein the alert based on the cross point when the degree of reliability of the map matching is below the preset-degree of reliability.

2. The drive support apparatus of claim 1, wherein
    the controller is further configured to compute a time difference between an arrival time of the subject vehicle to the cross point and an arrival time between the nearby vehicle to the cross point, and wherein
    the controller is further configured to determine the alert level based on the time difference, the cross point, the intersection node, and the reliability of the map matching.

3. The drive support apparatus of claim 1, wherein
    the controller is further configured to determine a state of the map matching, the state at least one of
        (i) a matched state that
    matches the current position of the subject vehicle to one road on the map, and
        (ii) a plurality of match candidates state that matches the current position of the subject vehicle to a plurality of roads on the map, and wherein
    the controller is further configured to determine that the degree of reliability of the map matching is the preset-degree of reliability for the matched state, and to determine that the degree of reliability of the map matching is below the preset-degree of reliability for the plurality of match candidates state.

4. The drive support apparatus of claim 1, wherein
    the controller is further configured to determine a state of the map matching, the state at least one of
        (i) a matched state that matches the current position of the subject vehicle to one road on the map,
        (ii) a not-yet-matched state where the current position of the subject vehicle does not match any roads on the map, and
        (iii) a transitions state where the map matching transitions from the matched state to the not-yet-matched state, and wherein
    the controller is further configured to determine that the degree of reliability of the map matching is the preset-degree of reliability for the matched state, and to determine that the degree of reliability of the map matching is below the preset-degree of reliability for the not-yet-matched state and the transition state.

5. The drive support apparatus of claim 1, wherein
    the controller is further configured to determine the map matching is lower than the preset-degree of reliability when the controller cannot determine the degree of reliability of the map matching.

6. The drive support apparatus of claim 1, wherein
    wherein the controller is further configured to determine the intersection node as a node closest to the current position of the subject vehicle in the travel direction of the subject vehicle.

7. A drive support system for providing an alert in a subject vehicle, the drive support system comprising:

a plurality of detectors;
a drive support apparatus in communication with the plurality of detectors, the drive support apparatus including:
a receiver configured to receive a navigation signal from a satellite;
a communication device configured to communicate with at least one of another vehicle and a roadside device; and
a controller configured to communicate with the receiver and the communication device, the controller further configured to
continuously determine a current position of the the subject vehicle by continuously obtaining the navigation signal;
determine a degree of reliability of a map matching that matches the current position of the subject vehicle onto a road on a map, based on a comparison between a locus of the current position of the subject vehicle and a road shape;
determine a predicted path of the subject vehicle based on the current position and a travel direction of the subject vehicle;
obtain a predicted path of a nearby vehicle from the communication device;
define a determination area around a cross point of the predicted path of the subject vehicle and the predicted path of the nearby vehicle when the cross point is within an intersection of a road on which the subject vehicle is traveling and a road on which the nearby vehicle is traveling;
determine whether an intersection node of the road on which the subject vehicle is currently traveling is map-matched by at least a preset-degree of reliability; and
determine whether the intersection node is within the determination area, wherein
the controller is further configured to output the alert at different alert levels, and
wherein
the controller is further configured to output the alert at a level below a highest alert level when the intersection node is not within the determination area, and wherein
the controller is further configured to determine the alert level at which to output the alert based on the cross point when the degree of reliability of the map matching is below the preset-degree of reliability.

* * * * *